United States Patent [19]

McDermitt, Jr. et al.

[11] Patent Number: 5,478,100
[45] Date of Patent: Dec. 26, 1995

[54] BICYCLE FRAME HAVING THRU THE TUBE CABLE ROUTING

[75] Inventors: Freedus A. McDermitt, Jr., St. Mary's; Fred R. Hemmelgarn, Cold Water; Larry D. Trout, Celina, all of Ohio

[73] Assignee: Huffy Corporation, Miamisburg, Ohio

[21] Appl. No.: 275,608

[22] Filed: Jul. 15, 1994

[51] Int. Cl.[6] ............................................. B62K 19/00
[52] U.S. Cl. ............................ 280/281.1; 74/487; 74/489
[58] Field of Search ........................ 280/281.1; 74/487, 74/489

[56] References Cited

U.S. PATENT DOCUMENTS

| | | | |
|---|---|---|---|
| 4,583,755 | 4/1986 | Diekman et al. | 280/281 |
| 4,905,541 | 3/1990 | Alan | 74/608 |
| 4,915,404 | 4/1990 | Chonan | 280/288.3 |
| 4,917,397 | 4/1990 | Chonan | 280/281.1 |
| 5,221,102 | 6/1993 | Spangler | 280/281.1 |
| 5,269,196 | 12/1993 | Rafac | 74/551.1 |

FOREIGN PATENT DOCUMENTS

| | | | |
|---|---|---|---|
| 411083 | 6/1947 | Italy | 280/281.1 |
| 432825 | 3/1948 | Italy . | |

Primary Examiner—Mitchell J. Hill
Attorney, Agent, or Firm—Biebel & French

[57] ABSTRACT

A bicycle frame is disclosed wherein the down tube component comprises at least one aperture therein adapted for reception of an operating cable of the bicycle therein. The down tube is connected to the head tube and the bottom bracket of the frame, An open end portion of the down tube extends below the bracket so that cable threaded through the aperture may exit thereat below the bracket. A ferrule surrounds the aperture and helps to seal same from water which may otherwise penetrate into the tube.

7 Claims, 4 Drawing Sheets

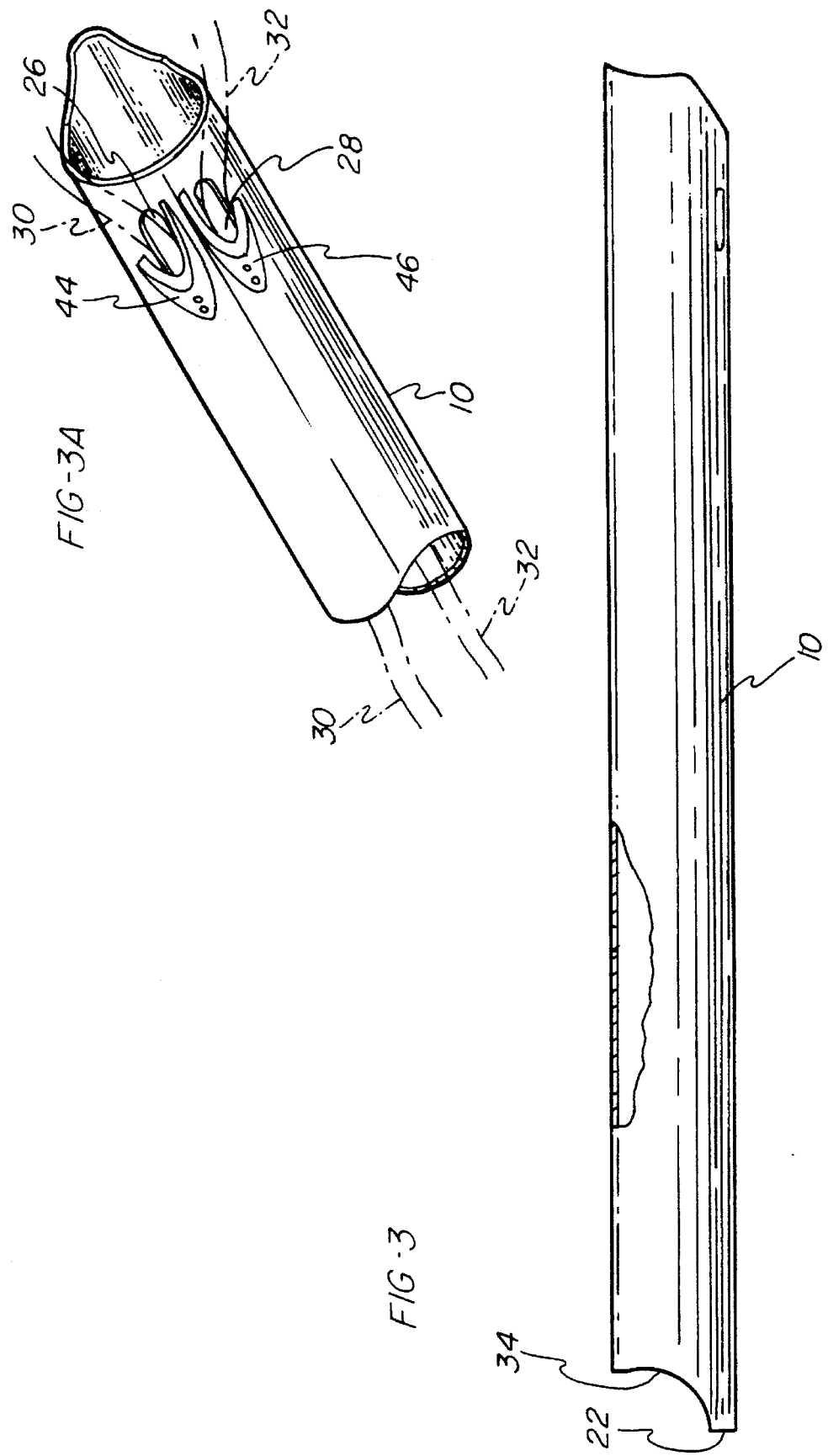

BICYCLE FRAME HAVING THRU THE TUBE CABLE ROUTING

FIELD OF THE INVENTION

The present invention pertains to a bicycle frame in which operational cables for the bike are routed through the interior of the frame tube members.

BACKGROUND OF THE INVENTION

Operational cables of bicycles are normally mounted along the outside of the tubular frame members. These cables are used to control both front and back wheel braking capacities and front and back shifting mechanisms such as the front and rear derailleurs.

Disposition of these cables outside of the frames has proven troublesome as the cables are exposed to possible damaging conditions. Also outside mounting of the cables along the tubular frame members sometimes covers the art work or graphics on the bike frame therefore adversely affecting aesthetic appeal characteristics.

Various attempts have been made in the past to thread or house operational cables through bicycle frames. For example, in U.S. Pat. Nos. 4,915,404 and 4,917,397 (Chonan) cables are threaded through tubular frame members. However, in accordance with these disclosures, adequate leeway for fluid drainage through the tubes is not provided for. Accordingly, moisture that enters the tube interior through the openings provided for the cables may cause corrosion problems.

Moreover, the bicycle frame shown in the '404 Chonan patent discloses the use of a cable guide member connected to the bottom bracket. In this disclosure, the cables must be carefully guided through the openings provided in the guide, thus calling for an intricate cable installation process.

Other prior art patents that disclose routing of bicycle cables through the frame tubes include Italian Patent 432825 and U.S. Pat. No. 4,583,755 (of common assignment herewith).

Prior art patents which may be of background interest to the invention include U.S. Pat. Nos. 4,905,541 and 5,269,196.

Despite the efforts of the prior art, there remains a need for a bicycle frame structure that facilitates threading or housing of bicycle operational cables inside the tubular frame members while providing for adequate drainage. There is a specific need for such structure which accomplishes these purposes and allows for easy threading of the cables through the frame tubes without requiring the addition of extra parts.

Further, it is highly desirable to provide a bicycle frame down tube of the type adapted for reception of an operative cable or cables therein that allows for exit of the operational cables at a location spaced below the crank arm assembly bracket so that chances of cable interference with pedalling are reduced.

SUMMARY OF THE INVENTION

These and other objects are met by the present invention which comprises a bicycle frame of the type in which a seat tube with a top and bottom end portion is providing along with a head tube having a top and bottom end. A down tube is provided and is connected to the bottom end of the head tube and the bottom end of the seat tube. A top tube spans between the head tube and the seat tube and is connected to the top ends of both.

The seat tube and down tube are joined at the bottom bracket which is adapted to receive a pedal and crank arm assembly therein. The down tube contains at least one aperture therein located proximate the top or upper end of the tube, This aperture is adapted to receive one of the operational cables of the bike therein. Normally, one of the derailleur cables is placed through this aperture, A second aperture located proximate the top portion of the down tube may be provided to receive another operational cable such as the cable ultimately connected to a rear wheel derailleur.

The down tube comprises an open end portion at its bottom that extends below the horizontal centerline of the bottom bracket. This provides a convenient location for exit of the operational cables that have, at first, been threaded through the apertures formed in the top portion of the down tube. Further, exit of the cables at this location under the pedal crank arm assembly received in the bottom bracket helps to minimize chances that the operator's foot or feet will engage the cable. Additionally, the cables are easily threaded through the don tube during assembly without need for inclusion of additional cable guide members or the like.

The open end of the down tube also provides a convenient drainage location for the tube, not only providing drainage but assuring that moisture will drip from under the bracket, away from the operator.

The top tube may also be provided with a pair of apertures located respectively at the front and back portions of the tube for threading of an operational cable such as a rear brake cable. Preferably, all of the apertures are surrounded by a ferrule which not only presents a smooth surfaces to protect the cable from abrasion as it passes through the aperture but also helps to provide a seal.

The invention will be further described in conjunction with the detailed description and appended drawings.

BRIEF DESCRIPTION OF THE DRAWINGS

FIG. 3 is a partially cut-a-way side elevational view of a down tube in accordance with the invention; and FIG. 3A is a partially cut-a-way bottom view showing a portion of the down tube shown in FIG. 3;

DETAILED DESCRIPTION OF THE PREFERRED EMBODIMENTS

Figure 1:
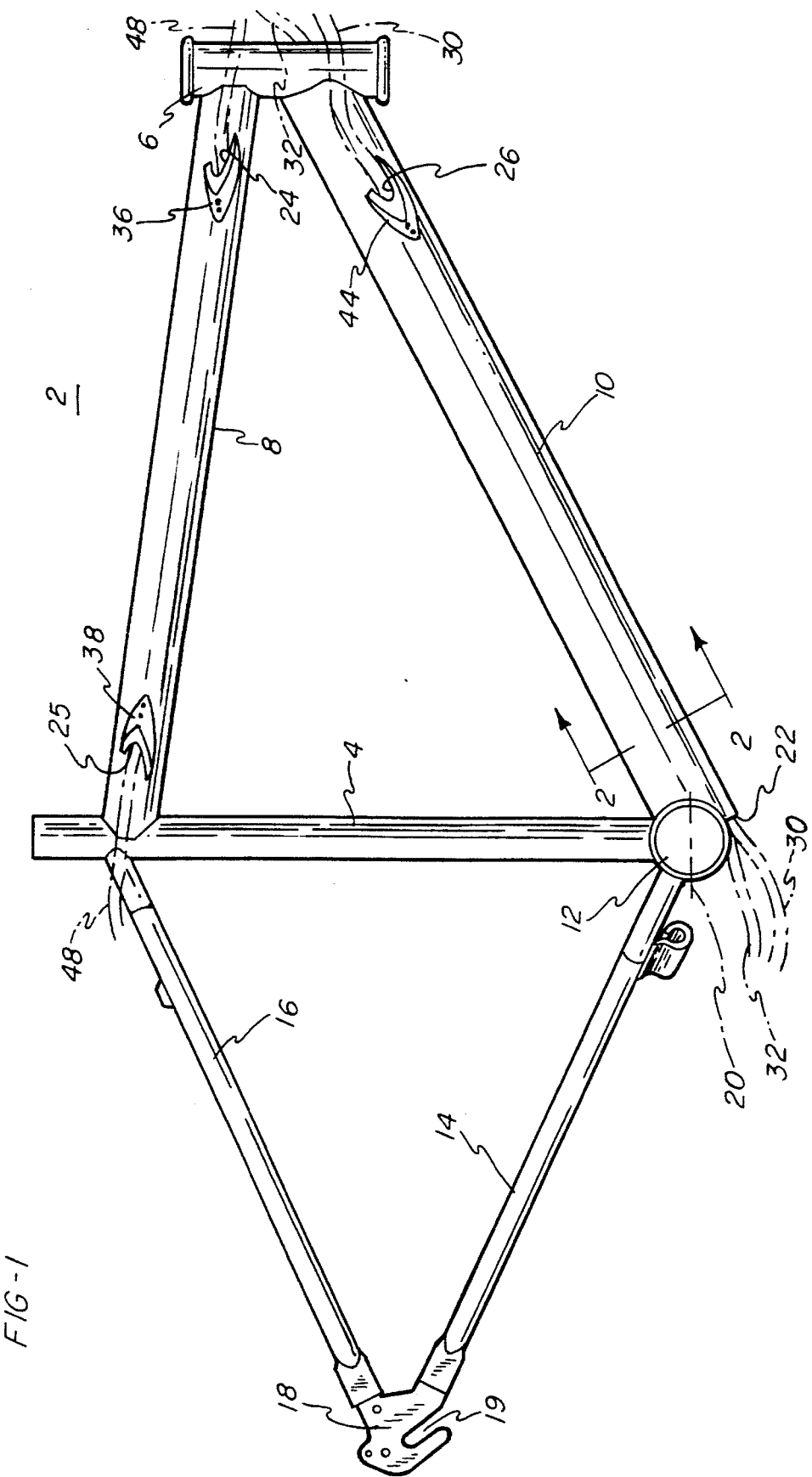
FIG. 1 is a side elevational view of a frame in accordance with the invention.

Turning now to FIG. 1 of the drawings, there is shown a bicycle frame 2 defined by seat tube 4, head tube 6, top tube 8, down tube 10 and bottom bracket 12. Top tube 8 connects the top portions of seat tube 4 and head tube 6. Connection joints are preferably welded.

Down tube 10 connects the bottom portion of seat tube 4 and bottom portion of head tube 6. A pair of chain stays 14 (only one shown) and a pair of seat mast stays 16 (only one shown) are provided and terminate in drop-outs 18 (only one shown). The other ends of the seat mast stays, and the chain stays are connected respectively to the seat tube and bottom bracket.

As is convention in the art, the rear wheel hub (not shown) is received within the drop out slots 19 (only one shown). Also, the bottom bracket 12 provides a circular threaded bore adapted for reception therein of a conventional pedal crank arm assembly. Horizontally disposed centerline 20 dissects the circle defined by the bore of the bottom bracket 12.

A pair of apertures (only one, 26, shown in FIG. 1) are provided in the top portion of down tube 10. These are each adapted to receive an operational cable therein. More specifically, the front and rear derailleur cables may for instance be received through these apertures and threaded downwardly within the down tube. These cables 30,32 then exit through open end 22 of the down tube which is located below centerline 20 and below the entirety of bracket 12. Open end 22 also serves to provide tube drainage at a position directly under the bracket 12.

Apertures 24, 25 formed proximate respective end-wise portions of top tube 8 provide entrance and exit locations for disposition of a cable such as a rear brake cable within this tubular frame member. Features 36, 38, 44 surround the apertures formed in the top and down tubes, partially shielding these apertures from water penetration.

Figure 2:
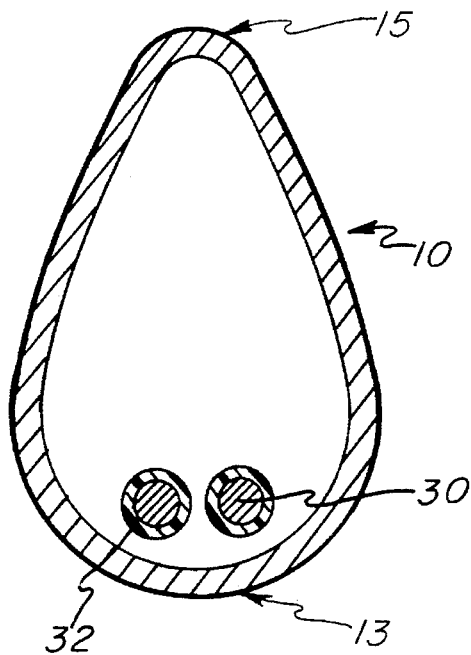
FIG. 2 is a sectional view taken along the lines and arrows 2—2 of FIG. 1.

As shown in FIG. 2, the cross-sectional shape of down tube 10 is elliptical. The down tube 10 includes a major arcuate portion 13 and a minor arcuate portion 15 which cooperate to define the generally elliptical cross-sectional shape of the down tube 10. Cables 30, 32 are disposed in the interior of down tube 10 along bottom side of same. The generally elliptical cross-sectional shape of the down tube 10 provides rigidity to the frame.

Turning to FIG. 3, there is shown down tube 10 and open end 22 thereof defined by the major arcuate portion 13. Located contiguous with and directly above opening 22 is cut out portion 34 of the down tube. Cut out portion 34 provides a smooth shaped recess in the form of a partial circle that mates with and is joined to the bottom bracket 12 by suitable joining means such as welding or brazing.

In FIG. 3A, the underside portion of the top end of down tube 10 is shown. Here, apertures 26, 28 are provided and are adapted for reception of a pair of operational cables therein. Ferrules 44, 46 surround the apertures 26, 28 respectively.

Figure 4:
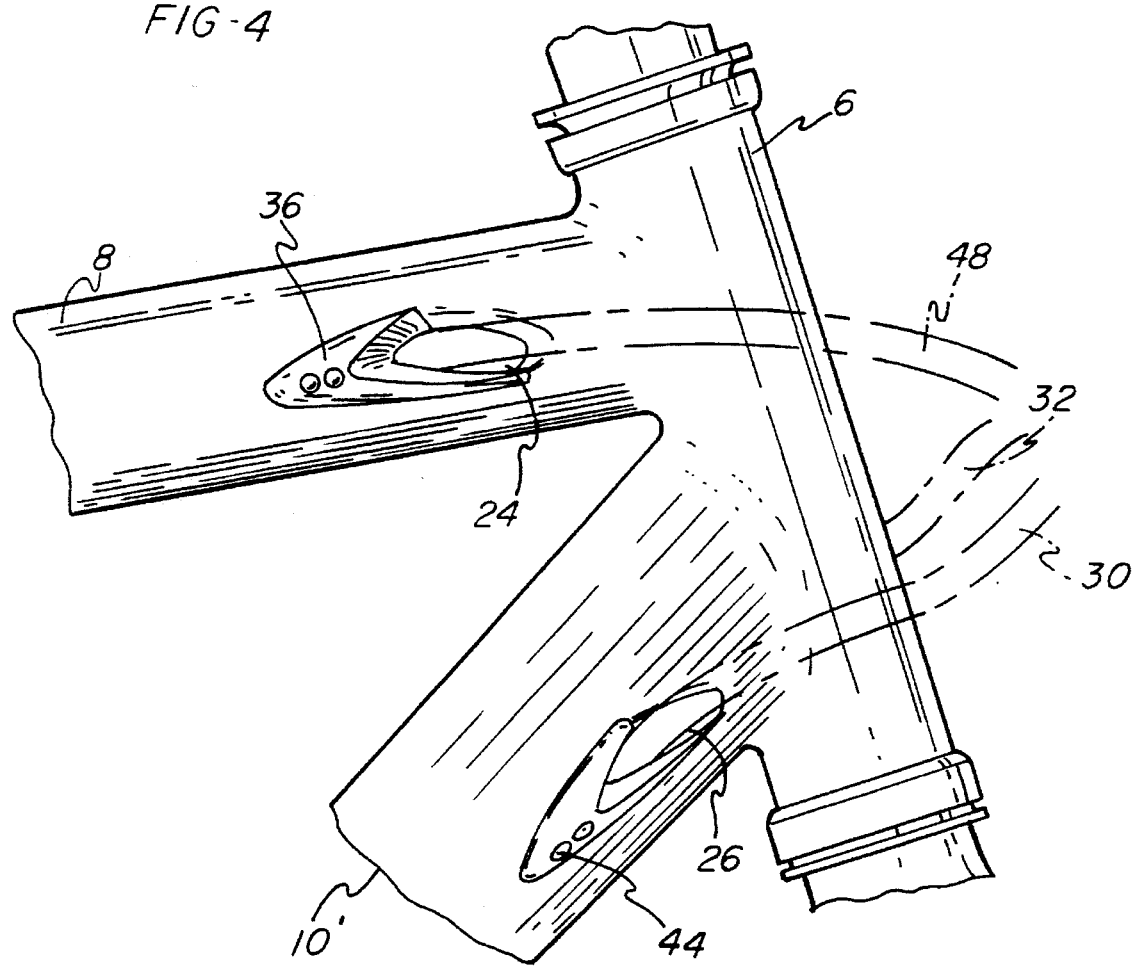
FIG. 4 is a side elevational view of the forward portions of the head tube, top tube and down tube frame members in accordance with the invention.

FIG. 4 shows aperture 24 of top tube and aperture 26 of down tube in association with ferrule members 36 and 44 respectively. Rear brake cable 48 is threaded through aperture 24 with rear derailleur cable 30 threaded through aperture 26. The ferrules may be composed of foam, rubber, or plastic and are adhered to the tubes by appropriate adhesive or, less preferably, by rivets. These ferrules surround the apertures and serve to shield same against water penetration therein.

Figure 5:
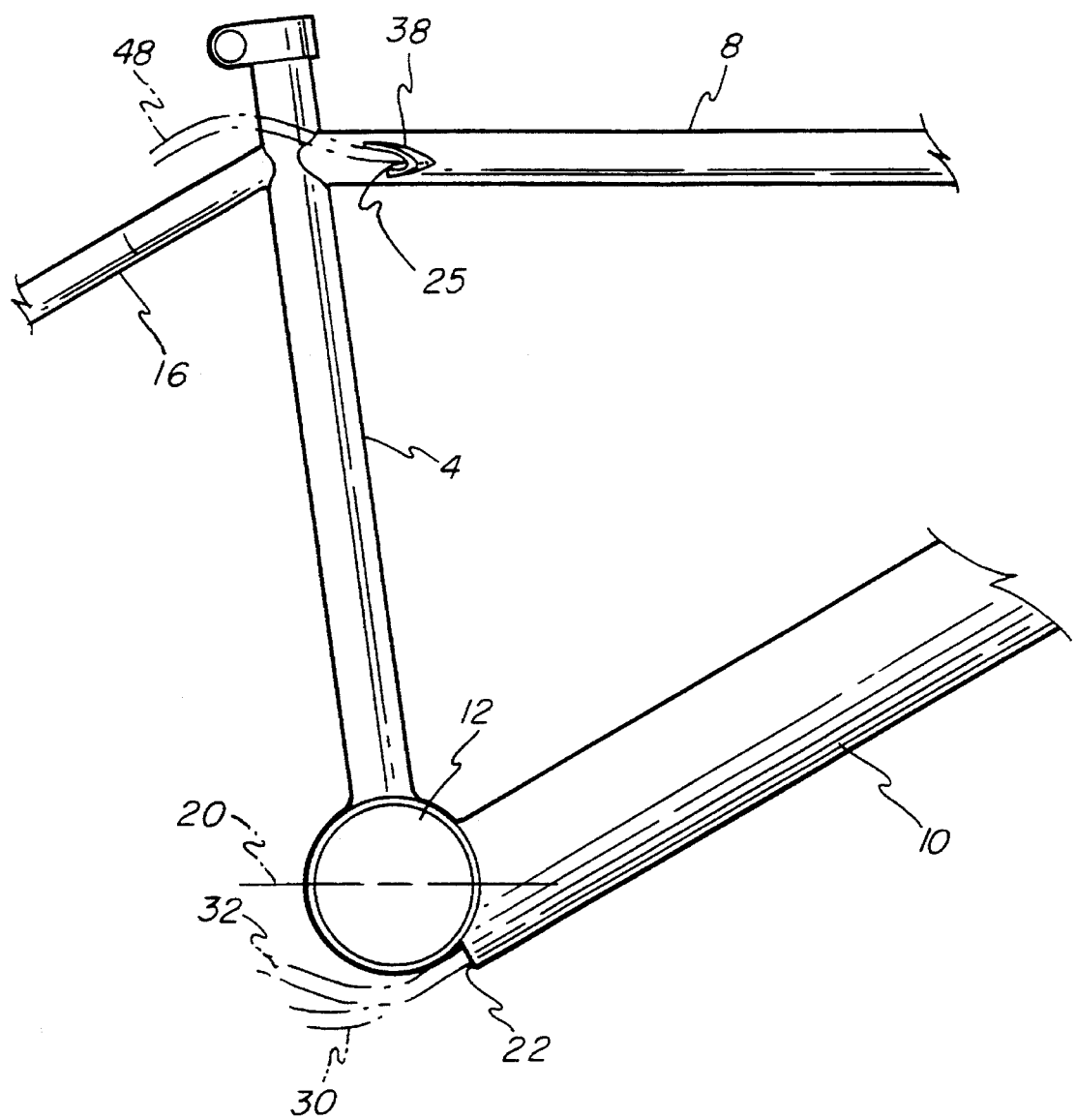
FIG. 5 is a side elevational view of the rearward portions of the seat tube, down tube and top tube frame members.

The rearward portions of top tube 8 and down tube 8 are shown in FIG. 5. Here, rear brake cable 48 is shown exiting aperture 25 formed in the down tube.

The frame tubes are preferably composed of mild steel although on some occasions, aluminum and titanium may be chosen. Also, MIG welding is the preferred method of joining the tubes although TIG welding and brazing may also be mentioned as effective means for joining the components.

While the forms of apparatus herein described constitute preferred embodiments of this invention, it is to be understood that the invention is not limited to these precise forms of apparatus, and that changes may be made therein without departing from the scope of the invention.

What is claimed is:

1. In a bicycle frame assembly of the type having a seat tube with a top and bottom portion and a head tube with a top and bottom portion, a top tube spanning between and connecting said seat tube portion and head tube top portion, a down tube spanning between and connecting said seat tube bottom portion and said head tube bottom portion at a bracket junction, a bottom bracket located at said bracket junction adapted for receipt of a crank arm assembly therein, said bottom bracket comprising a horizontally extending center line, the improvement wherein said down tube has a generally elliptically-shaped transverse cross-section having a major arcuate portion and a minor arcuate portion, one of said arcuate portions defining an open end portion extending below said center line.

2. Assembly as recited in claim 1 wherein said down tube comprises at least one aperture formed in a sidewall thereof and adapted for threading of an operating cable of said bicycle therein so that said cable can pass inside said down tube and exit through said open end portion of said down tube.

3. Assembly as recited in claim 2 further including a ferrule surrounding said aperture.

4. Assembly as recited in claim 1 wherein said top tube comprises a first and second aperture therein, said first aperture formed in a wall of said top tube proximate said head tube top portion, said second aperture formed in a wall of said top tube located proximate said seat tube.

5. Assembly as recited in claim 4 further including a ferrule surrounding each said first and second apertures formed in said top tube.

6. Assembly as recited in claim 1 wherein said arcuate portions define a cut out portion forming an end of said down tube, said down tube being joined to said bottom bracket at an interface defined by a portion of said bottom bracket and said cut out portion.

7. Assembly as recited in claim 6 wherein said cut out portion of said down tube is contiguous with said open end portion of said down tube,

\* \* \* \* \*